United States Patent [19]

Berlinger, Jr. et al.

[11] Patent Number: 6,101,892
[45] Date of Patent: Aug. 15, 2000

[54] GEAR FORM CONSTRUCTIONS

[75] Inventors: Bernard E. Berlinger, Jr., Furlong, Pa.; John Robert Colbourne, St. Albert, Canada

[73] Assignee: Genesis Partners, L.P., Horsham, Pa.

[21] Appl. No.: 09/057,170

[22] Filed: Apr. 8, 1998

Related U.S. Application Data

[60] Provisional application No. 60/043,165, Apr. 10, 1997.

[51] Int. Cl.$^7$ .................................................. F16H 55/06
[52] U.S. Cl. .............................................................. 74/462
[58] Field of Search ................................................ 74/462

[56] References Cited

U.S. PATENT DOCUMENTS

| | | |
|---|---|---|
| 466,923 | 1/1892 | Price . |
| 1,313,035 | 8/1919 | Williams . |
| 1,425,144 | 8/1922 | Schmick . |
| 1,613,702 | 1/1927 | Hammar . |
| 1,772,986 | 8/1930 | Dunham . |
| 2,031,888 | 2/1936 | Hill . |
| 2,071,317 | 2/1937 | Barkley . |
| 2,091,317 | 8/1937 | Hill . |
| 2,207,290 | 7/1940 | Hale . |
| 2,230,418 | 2/1941 | Wildhaber . |
| 2,308,558 | 1/1943 | Wildhaber . |
| 2,436,231 | 2/1948 | Schellens . |
| 2,686,155 | 8/1954 | Willis et al. . |
| 2,951,053 | 8/1960 | Reuter et al. . |
| 2,955,481 | 10/1960 | Jackel . |
| 2,990,724 | 7/1961 | Anderson et al. . |
| 3,180,172 | 4/1965 | Leggatt . |
| 3,232,134 | 2/1966 | Kluwe et al. . |
| 3,251,236 | 5/1966 | Wildhaber . |
| 3,371,552 | 3/1968 | Soper . |
| 3,533,300 | 10/1970 | Studer . |
| 3,631,736 | 1/1972 | Saari . |
| 3,709,055 | 1/1973 | Grove . |
| 3,855,874 | 12/1974 | Honma et al. . |
| 3,937,098 | 2/1976 | Rouverol ................................... 74/462 |
| 4,031,770 | 6/1977 | Ishikawa . |
| 4,051,745 | 10/1977 | Ishikawa . |
| 4,121,481 | 10/1978 | Riegler et al. . |
| 4,640,149 | 2/1987 | Drago ........................................ 74/462 |
| 5,271,289 | 12/1993 | Baxter, Jr. . |

FOREIGN PATENT DOCUMENTS

2 074 302  10/1971  France .

OTHER PUBLICATIONS

"Gear Nomenclature (Geometry) Terms, Definitions, Symbols and Abbreviations", AGMA Standard, Jun. 1976, pp. 1–20.

Buckingham, "Analytical Mechanics of Gears", McGraw–Hill, New York, 1949, republished by Dover, New York, 1963.

Primary Examiner—Allan D. Herrmann
Attorney, Agent, or Firm—Ratner & Prestia

[57] ABSTRACT

A gearing system which includes a pair of gears. The tooth profile of the first gear has three portions: a concave portion lying within the dedendum of the first gear, a convex portion lying within the addendum of the first gear, and a transition zone disposed between the concave and convex portions. Similarly, the tooth profile of the mating gear has three portions: a concave portion lying within the dedendum of the mating gear, conjugate to the convex portion of the tooth profile of the first gear; a convex portion lying within the addendum of the mating gear, conjugate to the concave portion of the tooth profile of the first gear; and a transition zone disposed between the concave and convex portions. The pair of gears may be designed such that no contact between meshing teeth is made along the transition zones. The tooth profiles of the gear pair have constant, or nearly constant, relative curvature. Alternatively, due to the shape of the tooth profiles, constant, or nearly constant, contact stress results when the gears are in mesh.

19 Claims, 4 Drawing Sheets

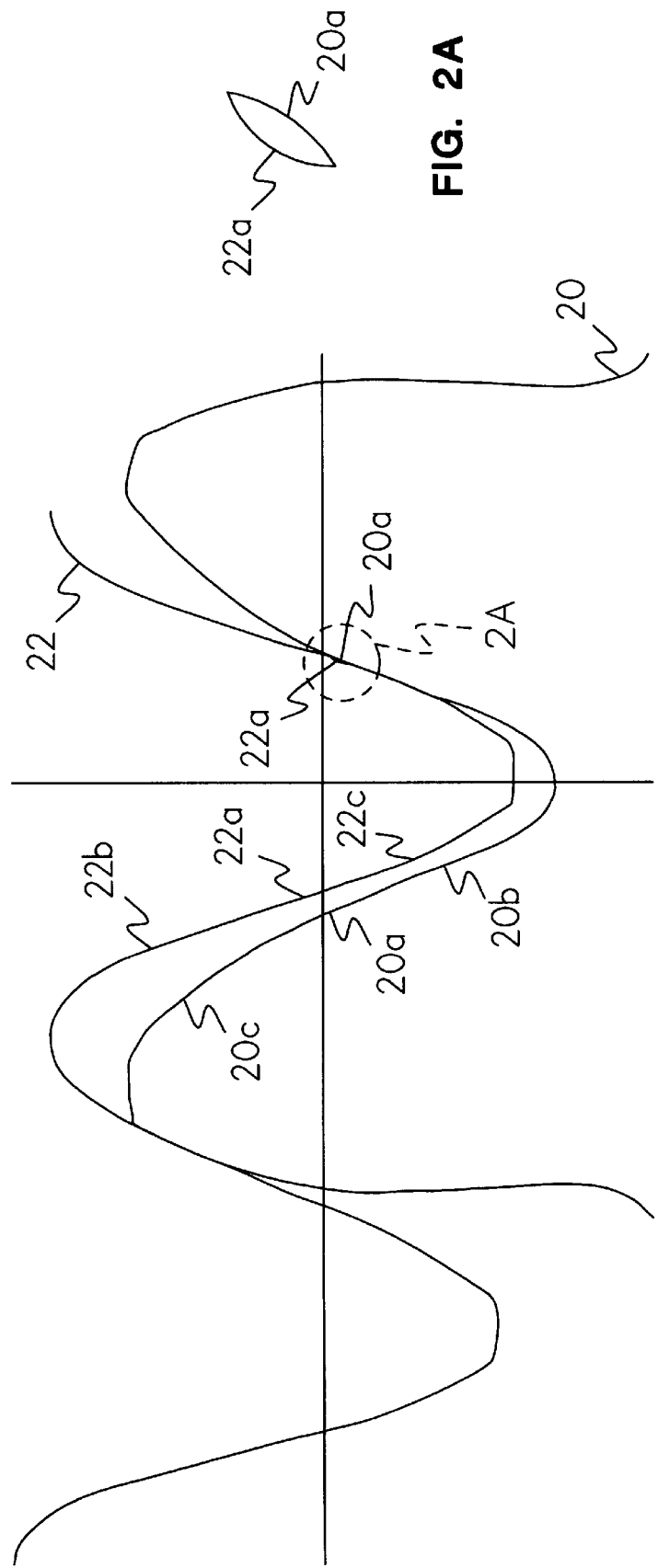

GEAR FORM CONSTRUCTIONS

This application claims benefit of Provisional Application Ser. No. 60/043,165 filed Apr. 10, 1997.

FIELD OF THE INVENTION

The present invention relates to the construction of profiles of conjugate gears. In particular, the present invention may be applied directly to the design and construction of spur gears, or as the transverse section profiles of helical gears.

BACKGROUND OF THE INVENTION

Several attempts have been made to reduce the contact stress in gear teeth, since a high contact stress causes pitting and eventually failure of the teeth. Many of these attempts have been based on the Wildhaber or Novikov types of gearing, in addition to the more common involute forms. In Novikov gears, the profiles in the transverse sections are circular arcs, the pinion being convex and the gear being concave. The problem with circular arc profiles is that they are not conjugate. With conjugate profiles, the angular velocity ratio is exactly constant. In each transverse section there is continuous contact throughout the meshing cycle, and the contact point moves along each profile, towards the tip of the driving tooth and towards the root of the driven tooth.

Since a variable angular velocity ratio is not acceptable, Novikov gears are always made helical. This means that in each transverse section, only one pair of points ever come into contact. At any instant, there will be one transverse section where contact occurs, and this contact point moves axially along the tooth face as the gears rotate. Such gears are generally noisy, and have not been widely used. The same comments apply to Wildhaber gears, which are shaped as circular arcs in the normal sections. More recently, other profiles have been proposed, in which there are two or more contact points in each transverse section. They still suffer, though, from the disadvantages just described.

SUMMARY OF THE INVENTION

A gearing system, constructed in accordance with the present invention, includes a first gear having a first plurality of teeth each having a first tooth profile and a mating gear having a second plurality of teeth each having a second tooth profile. The first tooth profile of the first plurality of teeth of the first gear includes a first transition zone disposed between a first concave portion lying within the dedendum of the first gear and a first convex portion lying within the addendum of the first gear. The second tooth profile of the second plurality of teeth of the second gear includes a second transition zone disposed between a second concave portion lying within the dedendum of the mating gear and a second convex portion lying within the addendum of the mating gear. The second convex portion of second tooth profile of the second plurality of teeth of the second gear is conjugate to the first concave portion of the first tooth profile of the first plurality of teeth of the first gear and the second concave portion of the second tooth profile of the second plurality of teeth of the second gear is conjugate to the first convex portion of the first tooth profile of the first plurality of teeth of the first gear.

BRIEF DESCRIPTION OF THE DRAWINGS

FIG. 2 shows conjugate profiles of a second gearing system constructed in accordance with the present invention.

FIG. 2A shows, on a greatly enlarged scale, a portion of the conjugate profiles of the FIG. 2 gearing system.

DETAILED DESCRIPTION OF THE INVENTION

Figure 1:
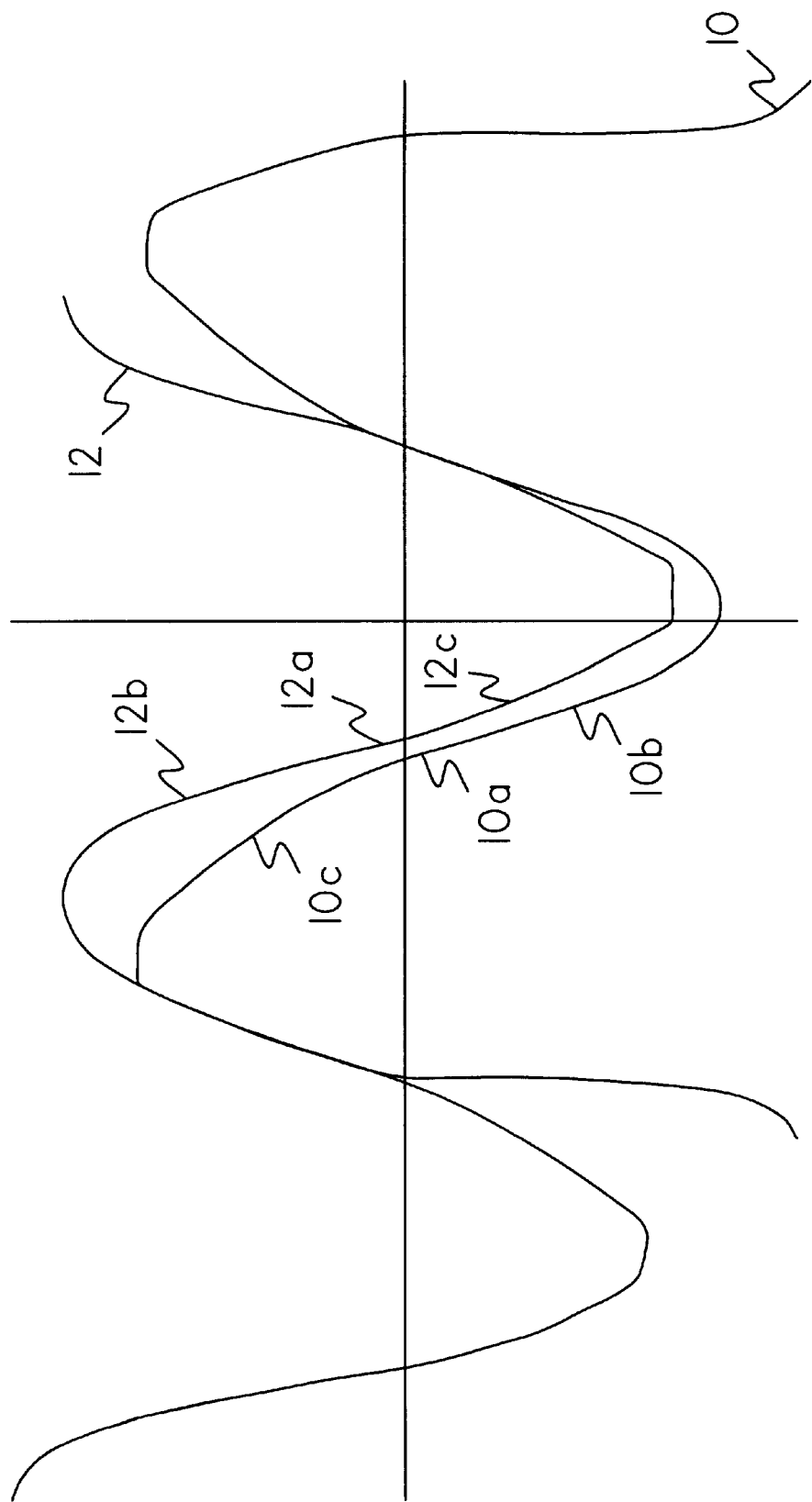
FIG. 1 shows conjugate profiles of a first gearing system constructed in accordance with the present invention.

Referring to FIG. 1, a gearing system, constructed in accordance with the present invention, includes a first gear 10 having a first plurality of teeth each having a first tooth profile and a mating gear 12 having a second plurality of teeth each having a second tooth profile. The first profile of the first plurality of teeth of the first gear 10 includes a first transition zone 10a disposed between a first concave portion 10b lying within the dedendum of the first gear and a first convex portion 10c lying within the addendum of the first gear. The second profile of the second plurality of teeth of mating gear 12 includes a second transition zone 12a disposed between a second concave portion 12b lying within the dedendum of the mating gear and a second convex 12c portion lying within the addendum of the mating gear.

The second concave portion 12b of the second profile of the second plurality of teeth of mating gear 12 is conjugate to the first convex portion 10c of the first tooth profile of the first plurality of teeth of first gear 10 and the second convex portion 12c of the second profile of the second plurality of teeth of mating gear 12 is conjugate to the first concave portion 10b of the first tooth profile of the first plurality of teeth of the first gear. In addition, the second transition zone 12a of the second profile of the second plurality of teeth of mating gear 12 can be conjugate to the first transition zone 10a of the first tooth profile of the first plurality of teeth of first gear 10, so that the second tooth profile of the mating gear is conjugate to the first tooth profile of the first gear. This means that when the gears are in mesh, the angular velocity ratio is constant.

A pair of conjugate profiles can be defined by either the pinion tooth profile, the gear tooth profile, the basic rack profile, or the shape of the contact path. When any one of these four shapes is known, it is possible to calculate the other three shapes. The methods by which these shapes are found have been described by Buckingham, *Analytical Mechanics of Gears*, McGraw-Hill, New York, 1949, republished by Dover, N.Y., 1963, incorporated in its entirety herein. The most common method for defining a pair of profiles is to choose the shape of the basic rack. For example, if the basic rack profile is straight, involute gears are obtained. Less commonly, the shape of one tooth profile is chosen. For example, in Gerotor internal gear pumps, the lobes of the outer rotor are circular. Less commonly still, the shape of the contact path is chosen. For example, cycloidal gears can be defined as having profiles for which the contact path consists of two circular arcs.

Consider the following method for designing conjugate gear tooth profiles. There are two important properties of conjugate profiles, which are described by Buckingham. First, they must satisfy the Law of Gearing, which states that the common normal at the contact point (also known as the line of action) always passes through the pitch point. Secondly, the radii of curvature $\rho_1$ and $\rho_2$ of the profiles must satisfy the Euler-Savary equation, $$\frac{1}{\rho_1 - S} + \frac{1}{\rho_2 + S} = \frac{1}{\sin\phi}\left(\frac{1}{R_{p1}} + \frac{1}{R_{p2}}\right), \quad (1)$$

where $R_{p1}$ and $R_{p2}$ are the pitch circle radii, $\phi$ is the gear pair pressure angle, namely the angle between the line of action and the line through the pitch point perpendicular to the line of centers; S is the distance from the pitch point to the contact point, positive when the contact point lies on one side of the line of centers, and negative on the other; $\rho_1$ and $\rho_2$ are the radii of curvature, positive for convex profiles and negative for concave profiles. The reciprocals of the radii of curvature, $1/\rho_1$ and $1/\rho_2$, are known as the curvatures.

It is important to note that whenever contact between meshing teeth is referred to herein it is understood that in fact for practical reasons meshing teeth of gears often only make contact through a thin lubricating film. Therefore, distinctions between 'contact' and 'no contact' are made based on a standard of thickness of and transmission of forces through such thin lubricating films.

If the relative curvature is to remain constant, the radii of curvature should satisfy the following relation, $$\frac{1}{\rho_1} + \frac{1}{\rho_2} = \text{constant.} \quad (2)$$

In other words, the gearing system shown in, for example, FIG. 1, or the like, may be designed in accordance with the present invention and such that the relative curvature of the first tooth profile and the second tooth profile is a constant.

If, instead, the contact stress is to remain constant, the radii of curvature should satisfy the following relation, $$\frac{1}{\cos\phi}\left(\frac{1}{\rho_1} + \frac{1}{\rho_2}\right) = \text{constant.} \quad (2a)$$

In other words, the gearing system shown, for example, in FIG. 1, or the like, may be designed in accordance with the present invention and such that the contact stress between meshing teeth of the first gear 10 with the mating gear 12 is a constant.

Equations (2) and (2a) may be replaced by any predetermined mathematical function set to a constant and parameterized (as are equation (2) and (2a)) by the radius of curvature associated with the first tooth profile and the radius of curvature associated with the second tooth profile. Equations (1) and (2), (1) and (2a), or (1) and any predetermined mathematical function (parameterized by the radii of curvature) set to a constant, may be solved to find the values of $\rho_1$ and $\rho_2$, whenever the values of S and $\phi$ are known.

The profiles of the two gears can now be found in the following manner. Choose an initial point $S=S_0$, $\phi=\phi_0$ on the contact path near the pitch point, where S and $\phi$ are the polar coordinates of the point. The radii $R_1$ and $R_2$ of the two profile points, and the corresponding profile angles $\phi_1$ and $\phi_2$, can now be found by conventional methods.

Once S and $\phi$ are known, the values of $\rho_1$ and $\rho_2$ can be calculated. It is now possible to construct a small increment of the tooth profile of the first gear as a circular arc of radius $\rho_1$. Then the radius $R_1$ and the profile angle $\phi_1$ at the end of the increment are calculated, and using the conventional theory of conjugate profiles the corresponding values of $R_2$, $\phi_2$, S and $\phi$ may also be calculated. The process is repeated as often as desired to construct the addendum of the first gear and the dedendum of the mating gear. Since the coordinates of a number of points on the contact path have been found, the shape of the basic cutter can be deduced by conventional methods. A family of gears is composed of gears that are conjugate to a basic cutter. The basic rack is the complement of the basic cutter, and the tooth profile of the basic rack is therefore the same as that of a gear belonging to the family with an infinite number of teeth.

To find the shape of the dedendum of the first gear and the addendum of the mating gear, the entire procedure explained above is repeated, starting from an initial point on the contact path on the opposite side of the pitch point. A suitable initial point is given by $S=-S_0$, $\phi=\phi_0$, but it is not essential to use these values. The recommended value of $S_0$ lies between 0.1 modules and 0.5 modules, where the module is a length defined in terms of the center distance C and the tooth numbers $N_1$ and $N_2$, as $2C/(N_1+N_2)$, while $\phi_0$ can be any value such that the profile angles $\phi_1$ and $\phi_2$ are positive at both initial points.

The above procedure describes a design for the addendum and the dedendum of each gear, but there is a short section of each profile between the addendum and the dedendum the shape of which is not yet determined. This section is called the transition zone.

The transition zone profiles can be designed in one of three ways. If the two initial points and the pitch point are collinear, the transition zone section of the basic rack corresponding to a gear can be formed by a straight line, so that the gear tooth profiles are involute in their transition zones. If the two initial points and the pitch point are not collinear, the dedendum and addendum sections of the basic rack can be joined by any smooth curve, such as a cubic curve, which provides continuity of profile and profile slope at the ends of the transition zones. Hence, the transition zone of a gear is formed by a smooth curve in the profile of the basic rack that corresponds to the gear.

If the gear tooth transition zones are designed by either of the methods just described, then the two gear tooth profiles will be conjugate along their entire lengths. The profiles can therefore be used for spur gears, for example, or the like, or as the transverse section profiles of helical gears, for example, or the like. These profiles suffer, however, from the disadvantage that the relative curvature, and therefore also the contact stress, is generally much higher in the transition zones than in the addendum or dedendum.

FIG. 1 shows a 21-tooth pinion and a 72-tooth gear, with involute transition zones 10a and 12a. In the addendum and dedendum, the contact stress is equal to 0.75 times the reference value, where the reference value is the contact stress at the pitch point of a 20° pressure angle of an involute gear pair, with the same tooth numbers, center distance, face width and input torque. At the pitch circles, however, in the middle of the transition zones, the contact stress is equal to 1.76 times the reference value. Thus the advantage of the constant contact stress design is lost.

The third design method, which is the preferred option, is to design the profiles so that there is no contact within the transition zones. In this case contact between meshing teeth is made only along the convex addendum and concave dedendum portions. For example, a gear and pinion system may be designed so that contact is made between the convex addendum portion of the gear and the concave dedendum portion of the pinion and between the convex addendum portion of the pinion and the concave dedendum portion of the gear. The profiles are therefore not conjugate in the transition zones. Hence, in order to maintain a constant ratio of the angular velocity of the first gear to the angular velocity of the mating gear, the gears should be helical with transverse section profiles designed in accordance with the present invention.

FIG. 2 shows the transverse section profiles of a 15-tooth pinion and a 90-tooth gear, which may be designed so that there no contact is made along the transition zones 20a and 22a. It is important to note that due to the scale of FIG. 2, and the slight and subtle nature of the transition zone it is impossible to discern simply by observing FIG. 2 the fact that no contact is made, at the flanks which are in contact, along the transition zone. This no contact condition is shown in FIG. 2A. Transition zones 20a and 20b of the right-most teeth of gears 20 and 22 are shown spaced apart (i.e. not in contact). The addendum 20c and 22c, and dedendum 20b and 22b portions of these profiles are designed using Equations (1) and (2a), with the maximum relative curvature equal to 51% of the reference value.

Since there is not continuous contact along the profile from the form circle to the tip circle, it is not possible to define the contact ratio in the conventional manner. A contact ratio for the dedendum, and a contact ratio for the addendum may be calculated, and the sum of these quantities will be called the total transverse contact ratio. The value of the total transverse contact ratio depends on the tooth numbers and the required contact stress. Table 1 gives the lowest achievable relative curvature, as a percentage of the reference value, if the total transverse contact ratio is to be at least 1.2.

TABLE 1

Lowest Achievable Relative Curvature, as a Percentage of the Reference Value, giving a Total Transverse Contact Ratio of at least 1.2.

| $N_2$ | 40 | 60 | 80 | 100 |
|---|---|---|---|---|
| $N_1$ | | | | |
| 15 | 52 | 51 | 51 | 51 |
| 20 | 51 | 51 | 49 | 49 |
| 30 | 51 | 49 | 49 | 49 |
| 40 | 49 | 49 | 49 | 49 |

If the transverse profiles of a gear pair are designed according to the procedure described above, using Equations (1) and (2a), then the contact stress will be constant provided the gears are spur gears. The situation in a helical gear pair is more complicated, since the contact stress depends on both the relative curvature in the normal section, and on the load intensity. The load intensity depends in turn on the lengths of the contact lines, which vary throughout the meshing cycle. The length of the contact lines may also be reduced when there is no contact in the transition zone. For profiles of this type there is no simple formula for calculating the contact stress. The contact stress, however, may be calculated numerically. The following conclusions may be drawn from such a calculation. When the transverse profiles are designed in accordance with the present invention, using either Equation (2) or Equation (2a), the relative curvature may be kept to about half the reference value, while still maintaining an adequate contact ratio (see Table 1). The contact stress is then approximately constant at all points of contact throughout the meshing cycle, and the maximum value is significantly less than the maximum contact stress that would occur in an involute gear pair with the same overall dimensions.

The method of profile construction described above may also be used to design the tooth profiles of an internal gear pair.

Alternatively, an internal gear may also be designed by conventional methods with a tooth profile which is conjugate to an external gear designed by the method described above. This procedure may be required in order to design a planetary gearset, in which the sun and the planet would be designed by the method described above, and the internal gear would be designed with a tooth profile conjugate to that of the planet.

It should be noted that gears constructed in accordance with the present invention may be cut by conventional methods. The external gears can be hobbed, generating ground or form ground, and the internal gears can be shaped, using a pinion cutter.

A basic rack designed in accordance with the present invention can be used, for example, as the profile of a crown gear, which defines the tooth profiles of a pair of bevel gears.

Figure 3A:
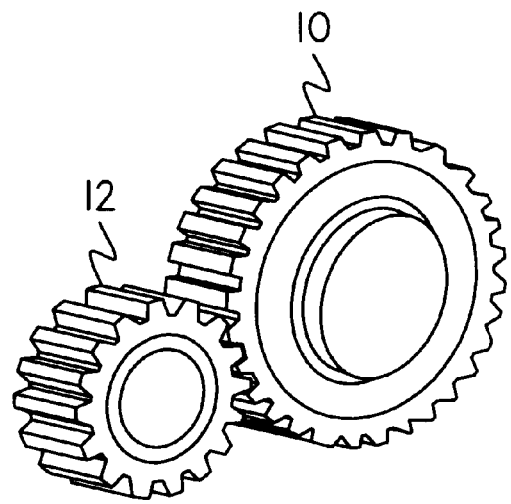
FIGS. 3A through 3D show a variety of types of gearing systems in which the present invention may be incorporated.
Figure 3B:
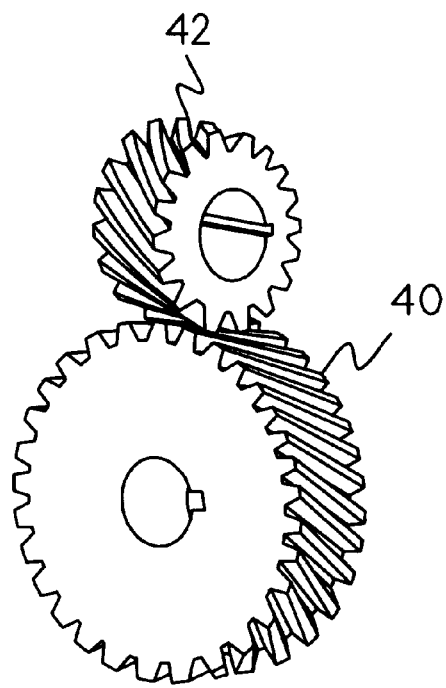
Figure 3C:
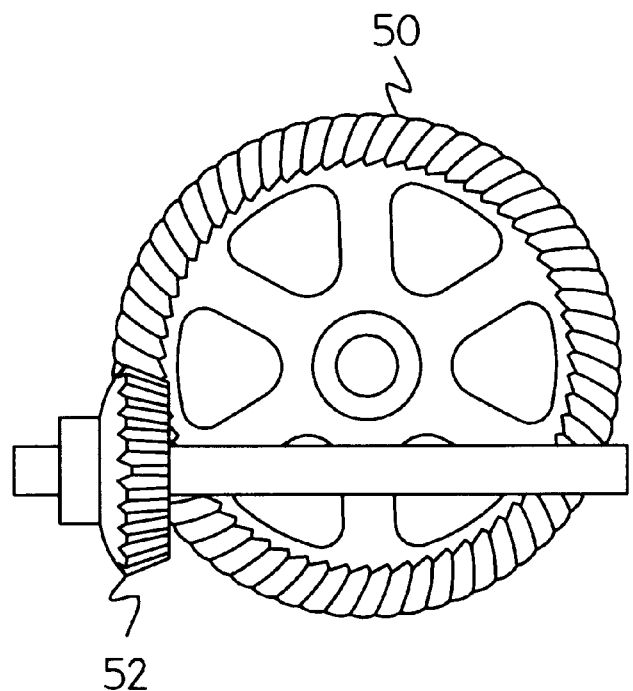
Figure 3D:
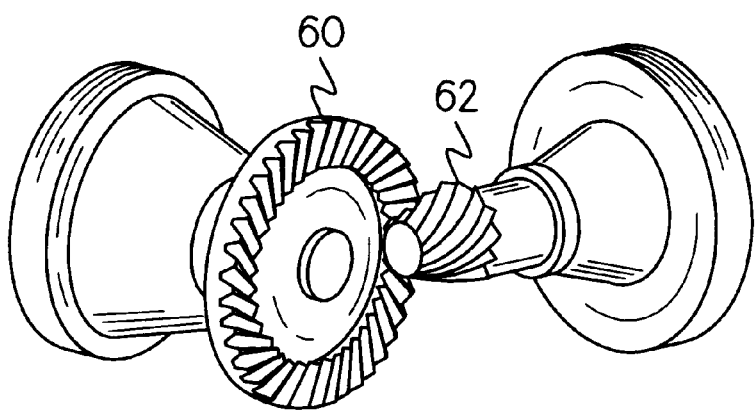

The present invention can be incorporated in various different gearing systems. In a the spur gearing system shown in FIG. 3A, the axis of rotation of first gear 10 is parallel to the axis of rotation of mating gear 12. In the crossed helical gearing system of FIG. 3B, the axis of rotation of first gear 40 is perpendicular to the axis of rotation of mating gear 42. In the hypoid gearing system of FIG. 3C, the axis of rotation of first gear 50 does not intersect the axis of rotation of mating gear 52. In the spiral bevel gearing system of FIG. 3D, the axis of rotation of first gear 60 is at an angle to the axis of rotation of mating gear 62.

While in the foregoing there have been described preferred embodiments of the present invention, it should be understood by those skilled in the art that various modifications and changes can be made without departing from the true spirit and scope of the present invention.

What is claimed:

1. A gearing system comprising:
   a first gear having a first plurality of teeth each having a first tooth profile including a first transition zone disposed between a first concave portion lying within the dedendum of said first gear and a first convex portion lying within the addendum of said first gear; and
   a mating gear having a second plurality of teeth each having a second tooth profile including a second transition zone disposed between a second concave portion lying within the dedendum of said mating gear, conjugate to said first convex portion of said first tooth profile of said first plurality of teeth of said first gear, and a second convex portion lying within the addendum of said mating gear, conjugate to said first concave portion of said first tooth profile of said first plurality of teeth of said first gear,
   wherein the relative curvature of said first tooth profile of said first plurality of teeth of said first gear and said second tooth profile of said second plurality of teeth of said mating gear is a constant which is less than the relative curvature of 20° pressure angle involute gears at their pitch point.

2. The gearing system of claim 1, wherein said first tooth profile of said first plurality of teeth of said first gear is conjugate to said second tooth profile of said second plurality of teeth of said mating gear.

3. The gearing system of claim 1, wherein a predetermined mathematical function parameterized by a radius of curvature associated with said first tooth profile of said first plurality of teeth of said first gear and a radius of curvature associated with said second tooth profile of said second plurality of teeth of said mating gear is a constant.

4. The gearing system of claim 1, wherein the axis of rotation of said first gear is parallel to the axis of rotation of said mating gear.

5. The gearing system of claim 1, wherein the axis of rotation of said first gear is at an angle to the axis of rotation of said mating gear.

6. The gearing system of claim 1, wherein said first tooth profile of said first plurality of teeth of said first gear is a first transverse section profile and said second tooth profile of said second plurality of teeth of said mating gear is a second transverse section profile.

7. The gearing system of claim 1, wherein contact between meshing of said first plurality of teeth of said first gear with said second plurality of teeth of said mating gear is made along:

(a) said first concave portion of said first tooth profile of said first plurality of teeth of said first gear and said second convex portion of said second tooth profile of said second plurality of teeth of said mating gear, and (b) said first convex portion of said first tooth profile of said first plurality of teeth of said first gear and said second concave portion of said second tooth profile of said second plurality of teeth of said mating gear.

8. The gearing system of claim 7, wherein said first gear and said mating gear are helical.

9. The gearing system of claim 8, wherein a ratio of the angular velocity of said first gear to the angular velocity of said mating gear is a constant.

10. The gearing system of claim 1, wherein said first gear has a basic rack profile having a transition zone corresponding to said first transition zone of said first tooth profile of said first plurality of teeth of said first gear which is a smooth curve.

11. The gearing system of claim 10, wherein said smooth curve of said transition zone of said basic rack profile is a straight line.

12. The gearing system of claim 1, wherein no contact between meshing of said first plurality of teeth of said first gear with said second plurality of teeth of said mating gear is made along said first transition zone and said second transition zone.

13. The gearing system of claim 7, wherein no contact between meshing of said first plurality of teeth of said first gear with said second plurality of teeth of said mating gear is made along said first transition zone and said second transition zone.

14. A gearing system according to claim 1 wherein said first and said second tooth profiles are not conjugate in said first and said second transition zones.

15. A gearing system according to claim 1 wherein said first and said second tooth profiles are conjugate in said first and said second transition zones.

16. A gearing system comprising:

a first gear having a first plurality of teeth each having a first tooth profile including a first transition zone disposed between a first concave portion lying within the dedendum of said first gear and a first convex portion lying within the addendum of said first gear; and a mating gear having a second plurality of teeth each having a second tooth profile including a second transition zone disposed between a second concave portion lying within the dedendum of said mating gear, conjugate to said first convex portion of said first tooth profile of said first plurality of teeth of said first gear, and a second convex portion lying within the addendum of said mating gear, conjugate to said first concave portion of said first tooth profile of said first plurality of teeth of said first gears, wherein the maximum contact stress between meshing of said first plurality of teeth of said first gear with said second plurality of teeth of said mating gear is less than the contact stress of 20° pressure angle involute gears at their pitch point.

17. The gearing system of claim 16, wherein there is no contact in said first transition zone and said second transition zone between said first tooth profile of said first plurality of teeth of said first gear and said second tooth profile of said second plurality of teeth of said mating gear.

18. A gearing system according to claim 16 wherein said first and said second tooth profiles are not conjugate in said first and said second transition zones.

19. A gearing system according to claim 16 wherein said first and said second tooth profiles are conjugate in said first and said second transition zones.

* * * * *